United States Patent
Cras et al.

(10) Patent No.: US 9,195,841 B2
(45) Date of Patent: Nov. 24, 2015

(54) AUTOMATED AND DELEGATED MODEL-BASED ROW LEVEL SECURITY

(71) Applicants: Jean-Yves Yannick Cras, Levallois Perret (FR); Gilles Vergnory Mion, Levallois Perret (FR); Damien Guinan, Dublin (IE); Helmut Petritsch, Walldorf (DE)

(72) Inventors: Jean-Yves Yannick Cras, Levallois Perret (FR); Gilles Vergnory Mion, Levallois Perret (FR); Damien Guinan, Dublin (IE); Helmut Petritsch, Walldorf (DE)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 13/832,523

(22) Filed: Mar. 15, 2013

(65) Prior Publication Data

US 2014/0280345 A1 Sep. 18, 2014

(51) Int. Cl.
*G06F 17/30* (2006.01)
*G06F 21/62* (2013.01)

(52) U.S. Cl.
CPC ........ *G06F 21/62* (2013.01); *G06F 2221/2113* (2013.01)

(58) Field of Classification Search
CPC ............ G06F 21/62; G06F 2221/2113; G06F 17/30289
USPC ............. 707/781, 782, 723; 706/45; 709/225; 726/2, 4, 17, 27, 28, 29, 30
See application file for complete search history.

(56) References Cited

U.S. PATENT DOCUMENTS

| | | | |
|---|---|---|---|
| 5,555,403 A | 9/1996 | Cambot | |
| 7,610,272 B2 * | 10/2009 | Zurek | 1/1 |
| 7,774,463 B2 * | 8/2010 | Bloching et al. | 709/225 |
| 8,763,095 B2 * | 6/2014 | Buehl | 726/4 |
| 2006/0116984 A1 * | 6/2006 | Zurek | 707/3 |
| 2013/0276066 A1 * | 10/2013 | Buehl | 726/4 |

OTHER PUBLICATIONS

Umeshwar Dayal et al., Data Integration Flows for Business Intelligence, 2009, ACM, 1-11.*
SAP Business Objects; Information Design Tool User Guide, SAP BusinessObjects Business Intelligence platform 4.0 Support Package 5; Chapter 15 Managing security; published online Nov. 6, 2012; pp. 249-276 (http://help.sap.com/businessobject/product_guides/boexir4/en/xi4sp5_info_design_tool_en.pdf).
SAP AG; Authorization Objects; published in SAP Library-Authorizations in mySAP HR; Copyright 2003 SAP AG; extracted online Jun. 19, 2013; 2 pages; (http://help.sap.com/saphelp_470/helpdata/en/5c/73ba3bd14a6a6ae10000000a114084/content.htm).
Glen Spalding et al.; Authorization Objects—A Simple Guide; Copyright 2006 SAP AG; 15 pages (http://www.sdn.sap.com/irj/scn/go/portal/prtroot/docs/library/uuid/a92195a9-0b01-0010-909c-f330ea4a585c?QuickLink=index&overridelayout=true&5003637386464).

* cited by examiner

*Primary Examiner* — Jean B Fleurantin (57) ABSTRACT

Business groups are created to secure business entities of a BI data model. In one aspect, a user to be secured is selected and a business group of the BI model is retrieved. Based on the business group, access to a business entity of the BI model is secured. The business group is associated with the business entity it secures. A value of the secured business entity is selected. A user is secured by assigning the user to the business group for the selected value. The value of the secured business entity is assigned to the user. In one aspect, requests from the user to access the secured business entity are filtered based on the assigned, to the user, value of the business entity.

10 Claims, 7 Drawing Sheets

AUTOMATED AND DELEGATED MODEL-BASED ROW LEVEL SECURITY

BACKGROUND

In computer systems security, a traditional way of controlling access to computer resources is based on roles. Examples of computer resources include, but are not limited to, software systems and applications, files and folders, data objects, database tables, etc. System roles may be defined to encompass both business duties and access to corresponding resources needed to carry out those duties. Users may be assigned to different roles based on their competencies and responsibilities in an organization. The operations or actions that a user is permitted to perform may be determined by the user's role. For example, depending on his role a user may be allowed only to read a file, but not to modify it. Access rights to system resources and corresponding actions permitted to be performed on those resources are grouped by the system roles.

Typically, computer software systems grant access rights to information based on user roles. Operating systems, for example, may use access control lists (ACLs) to control which users can access files and folders. In another example, Database Management Systems (DBMSs) may enforce access control on system login level, on database level, and on objects within a database such as tables. In both examples, the degree to which the access to information is controlled extends only to a certain level of granularity. For example, operating systems may control access to user files, but not to portions of user files. DBMSs may control access to tables but may not control access on row-level or cell-level. In some scenarios, however, there may be a requirement to control access at a more granular level.

BRIEF SUMMARY

Business groups are created to secure business entities of a BI data model. In one aspect, a user to be secured is selected and a business group of the BI model is retrieved. Based on the business group, access to a business entity of the BI model is secured. The business group is associated with the business entity it secures. A value of the secured business entity is selected. A user is secured by assigning the user to the business group for the selected value. The value of the secured business entity is assigned to the user. In one aspect, requests from the user to access the secured business entity are filtered based on the assigned, to the user, value of the business entity.

BRIEF DESCRIPTION OF THE DRAWINGS

The claims set forth embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for automated and delegated model-based row level security are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Generally, business intelligence (BI) refers to a category of software systems and applications used to improve business enterprise decision-making and governance. Such software tools provide techniques for analyzing and leveraging enterprise applications and data. BI systems can include reporting and analysis tools to analyze, forecast and present business related information. Typically, these systems also include content delivery infrastructure for delivery, storage and management of reports and analytics. BI systems may also include data warehousing for cleansing and consolidating information from disparate sources. BI systems are commonly applied to financial, human resource, marketing, sales, service provision, customer and supplier analyses. Often, granting permissions on a resource level in BI systems may be insufficient mechanism to enforce security measures. A user may be allowed to access and retrieve certain type of resource in the BI system, but, depending on user's role and responsibilities, security standards or policies may prescribe that the user be allowed to see only certain portions of that BI resource. For example, a sales manager may be allowed to access and retrieve sales number for geographies only in a particular region. Thus, instead of granting access to all information pertaining to a business object defined in the BI system, it may be needed to restrict the access to specific values or ranges of values of the business object.

Typically, BI systems exploit BI data models to enable access to underlying data sources. Examples of such underlying data sources may be relational databases and Online Analytical Processing (OLAP) cubes. In one embodiment, a BI data model is a collection of metadata objects that provides a semantic abstraction of the underlying data source that enables business users to query the underlying data sources and analyze data via non-technical language. BI data models form a semantic layer of BI systems. An example of a BI data model is SAP® BusinessObjects™ Semantic Layer on which BI tools are based, in order to provide business users with a unified and intuitive way of understanding corporate data. In this model the data are mapped into business terms which are more easily understood across an organization. Another example of a BI data model is SAP® HANA® Analytic packages.

A BI data model may include objects that correspond to business entities. A business entity is an entity defined within a semantic domain. Business entities are assigned common business terms such that the user does not need to understand the specific logic of the underlying data source but can work with familiar terminology when constructing queries or otherwise accessing data. Examples of business entities or business objects include, but are not limited to, dimensions, measures, hierarchies, attributes, pre-defined calculations, functions, queries, etc. Relationships are defined between business entities of a BI data model.

Dimensions are objects that model sets of business entities of a common nature such as geographical locations, products or groups of products, time periods, etc. Dimensions may be used to structure analyses of, for example, enterprise data. Dimensions can have properties, attributes, or details attached to them. For instance, a 'Customer' dimension could have an address. A dimension can be structured into OLAP hierarchies. For instance, dimension 'Countries' may include dimension 'States', which in turn may include dimension 'Cities'. When a dimension object is directly used in a report, the business term assigned to the dimension as an attribute may be a unique name or caption designed to be user-friendly. A dimension can be mapped to one or more table columns or can be a function in a database to represent an axis of analysis in a query. A dimension may classify an aspect of an activity in a business environment. For example, 'Product', 'Geography', 'Time', and 'Employee' are examples of common dimensions.

Measures are objects of the BI that model quantities or variable items that usually take their values as functions of sets of values for dimension objects. For instance, a 'Sales Revenue' measure is a numerical value. There may be a distinct value of this measure for each geographical location, each period of time, and each product or set of products. A measure can be associated with the group of dimensions on which it depends, called dimensionality of the measure. For instance, the dimensionality of the measure 'Revenue' may be '{Geography, Time, Product}'. Whereas the dimensionality of a measure 'Population' might be, for example, '{Geography, Time}' since populations of geographical entities vary with time but are not related to products.

A semantic layer of a BI system may further include a data foundation metadata that describes a connection to, structure for, and aspects of the underlying data source. For example, a data foundation is a schema that defines the relevant tables and joins from one or more relational databases. The data foundation may be built by adding derived tables, alias tables, calculated columns, additional joins, contexts, prompts, lists of values, and other SQL definitions. A data foundation may be a basis of one or more semantic layers. Business entities or objects of a BI model may be mapped via SQL expressions to a data foundation of underlying relational database or via Multidimensional eXpressions (MDX) expressions to an underlying OLAP cube.

One incarnation of the Semantic Layer is a universe such as the SAP® BI Universe. A universe is a form of BI data model.

Once a BI model is constructed, it may be compiled with connections and data foundation, published, and deployed as a universe. In the universe, business terms are presented by business objects, e.g. dimensions and measures, which are linked to form the universe. A universe may include connections to data sources so that users can connect to the universe, run queries and create reports using the objects in the universe without needing to know the underlying data structures.

In some scenarios, access control on resource level such as a file or a database table, may not be sufficient to meet business requirements. For example, compensation data for all employees of an organization may be stored in same one or more tables within a database. To do otherwise would complicate, for example, implementation of payroll applications when it comes to produce paychecks of the employees. Managers, however, may only be permitted to review information related to their own direct or indirect reports. To meet security policies, managers may not be permitted to review details of payroll information for other departments within the organization, but might be allowed to review summary payroll information across the organization as means to recruit and retain qualified employees. In such case, granting or denying access for retrieving compensation data from the entire one or more tables, for example, granting a permission to execute any select statement on the tables may be ineffective approach to meet security requirements.

Common approach to implement security measures on a more granular level than on resource level is access control on row level. Row level security restricts data access by row within one or more database tables. Row level security is a method of providing another level of access security in a database by exploiting existing business data in the database, e.g., access may be restricted based on data in a row such as a value of an attribute. Technically, to retrieve data from a database, a database query is generated. For example, a Structured Query Language (SQL) select statement may be executed. To implement row level security, filtering logic may be automatically applied, depending on the user requesting to access the database. For example, based on the user's data access privileges, a compulsory feature may be automatically added to the original database query to filter out data to which the user should not be granted access. For example, a filer may be added in a where clause of the select statement.

In a BI system such as SAP® BusinessObjects™ Business Intelligence platform, access control including row level security may be implemented via security profiles. A security profile controls the data and metadata displayed to users and modifies the parameters defined in the data foundation and/or BI data model. Security profiles may be defined, for example, on a published universe. Once a security profile is assigned to a user or a group of users, the settings in the profile determine what objects, data, and connections the user can access when connecting to, for example, the universe or other BI data model.

Data security profiles have security settings defined on objects in the data foundation and on data connections. Whereas, a business security profile is a group of security settings or access privileges defined on business entities of the BI data model. When a security profile is assigned to a user, the security settings defined in the profile are applied whenever the user runs a query, for example, on a universe. In a universe, business security profiles may include filters settings, among other security settings. In a business security profile, filters settings may use business entities defined in the BI data model. For example, filters may be defined on dimensions and measures of a universe. When a user that is assigned the respective business security profile runs a query, respective filters are applied at runtime to the query to filter the data to be returned based on the user's business security profile. Security profiles are applied at runtime, upon running a query, for example.

To illustrate with an example, user 'A' may be a sales manager of the northern region and user 'B' may be a sales manager of the southern region of the same organization. Both may be users of the same BI system and may use the same BI tools and reports. For example, both users as part of their duties may generate a query to retrieve data for the number of sales. Employee information such as location information of the employee may be stored for both users 'A' and 'B. Based on the employee information, a business security profile may be set up for both users 'A' and 'B', where the profile may specify a filter on the dimension 'Region'. Based on the security profile, when user 'A' requests the number of sales at runtime, the filter on the dimension 'Region' with value 'Northern' may be applied and data of the number of sales for the northern region may be returned. Respectively, when user 'B' requests the number of sales at runtime, the filter on the dimension 'Region' with value 'Southern' may be applied and data of the number of sales for the southern region may be returned.

In scenarios where row-level security is to be enforced for multiple users of multiple organizations, administering the row-level security may be cumbersome, time-consuming, and prone to errors. In one embodiment, automated and delegated row-level security based on a BI data model is implemented. A business group is created to secure a business entity of a BI model. To secure a business entity may refer to applying security constraints or restrictions. In one embodiment, business entities are secured on row-level. Requests to access the secured business entity are filtered for users that are assigned membership to the business group. In one embodiment, a business user of BI system is a user assigned membership to at least one business group. Business users have limited access and administration rights on business entities of the BI model, where the access and administration rights are limited based on membership of the users to business groups. An administrator is a business user that may have administration rights to create business groups and to assign membership of business users to those business groups. The administrator enforces row-level security to business users of the BI system.

Figure 1:
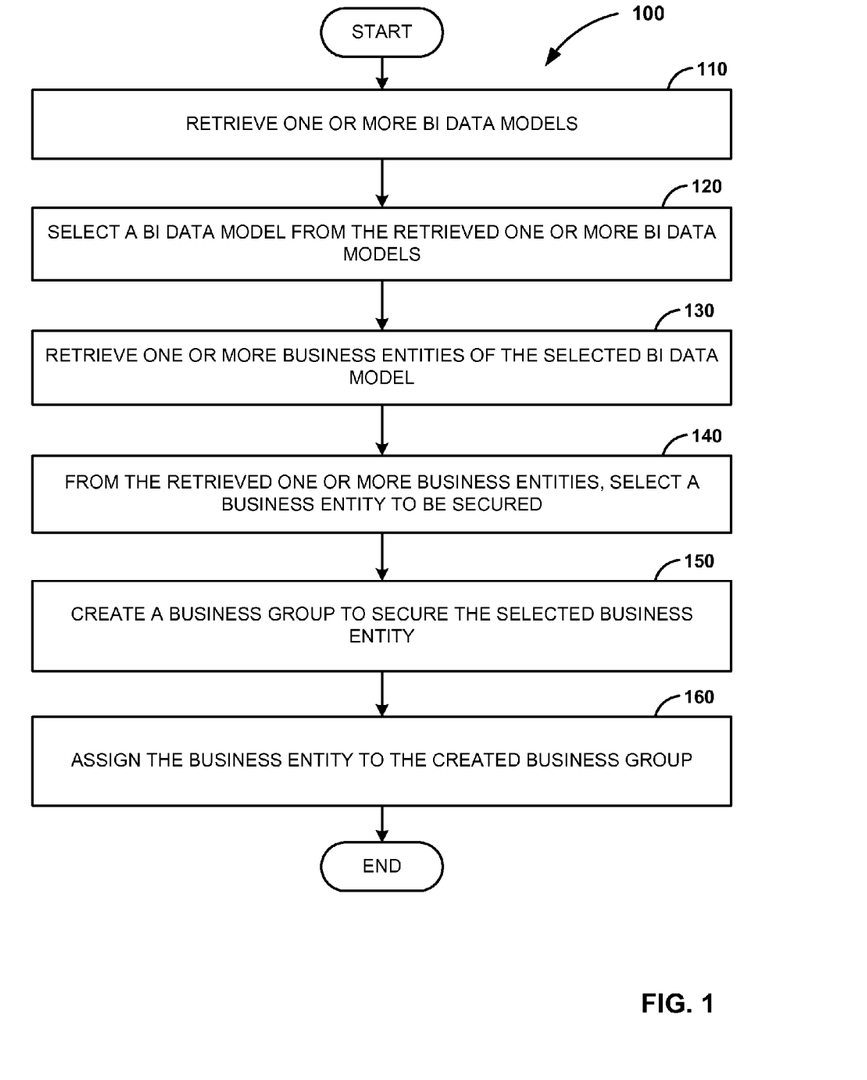
FIG. 1 is a flow diagram illustrating a process to create a business group to secure a business entity of a BI data model, according to one embodiment.

FIG. 1 illustrates process 100 to create a business group to secure a business entity of a BI data model, according to one embodiment. A business group groups business users that have limited access to values of the business entity that is secured by the group. A business group is, for example, an administrative group that defines a specific business organization or business function. For example, a business group 'City Manager' groups business users that have access limited by one or more cities. For example, one business user that is assigned membership to business group 'City Manager' may access data related to city 'Paris', whereas another business user assigned membership to the same business group 'City Manager' may be granted access to data related to city 'New York'. Business group 'Store Manager', for example, groups business users that have access limited by a specific store. Yet another example is a business group 'Category Manager' that groups business users that have access rights limited by a specific product category.

At 110, one or more BI data models are retrieved. In one embodiment, an administrator may log into an administration portal of a BI system. The administrator requests to view BI data models available in the BI system. Upon requesting to view the available BI data models, the one or more BI data models are retrieved and displayed. For example, a list with available universes may be retrieved.

At 120, a BI data model is selected from the retrieved one or more BI data models. For example, a universe 'Retailer 1' may be selected by the administrator. At 130, one or more business entities of the selected BI data model are retrieved. The retrieved business entities may be candidates to be secured by a business group. For example, a list of available dimensions in the universe may be such candidates. Typically, dimensions may have a fixed number of values that can be enumerated, for example, a set of cities, a set of products, etc. For other types of BI data models, other corresponding objects, such as attributes or characteristics, may be retrieved as candidates to be secured.

In one embodiment, among the available business entities in the BI model there may be business entities that are specified as non-securable by business groups. For example, dimension 'Time' may be a business entity that is not suitable to be secured because, typically, values of 'Time' are not enumerated. The business entities that can be secured via business groups may be specified, for example, by flagging the business entities. In one embodiment, securable business entities are entities that can be secured by a business group. Specifying business entities as securable or non-securable may be performed during the design of the BI data model.

Once available business entities that can be secured are returned to the administrator, the administrator may explore the business entities to determine one or more business entities to secure. At 140, a business entity is selected to be secured from the retrieved business entities. For example, an administrator may select to secure dimension 'City'. At 150, a business group is created to secure the selected business entity. In one embodiment, a business group could have been already created, e.g., before the business entity is selected to be secured. To secure the selected business entity, at 160, the business entity is assigned to the created business group.

Figure 2:
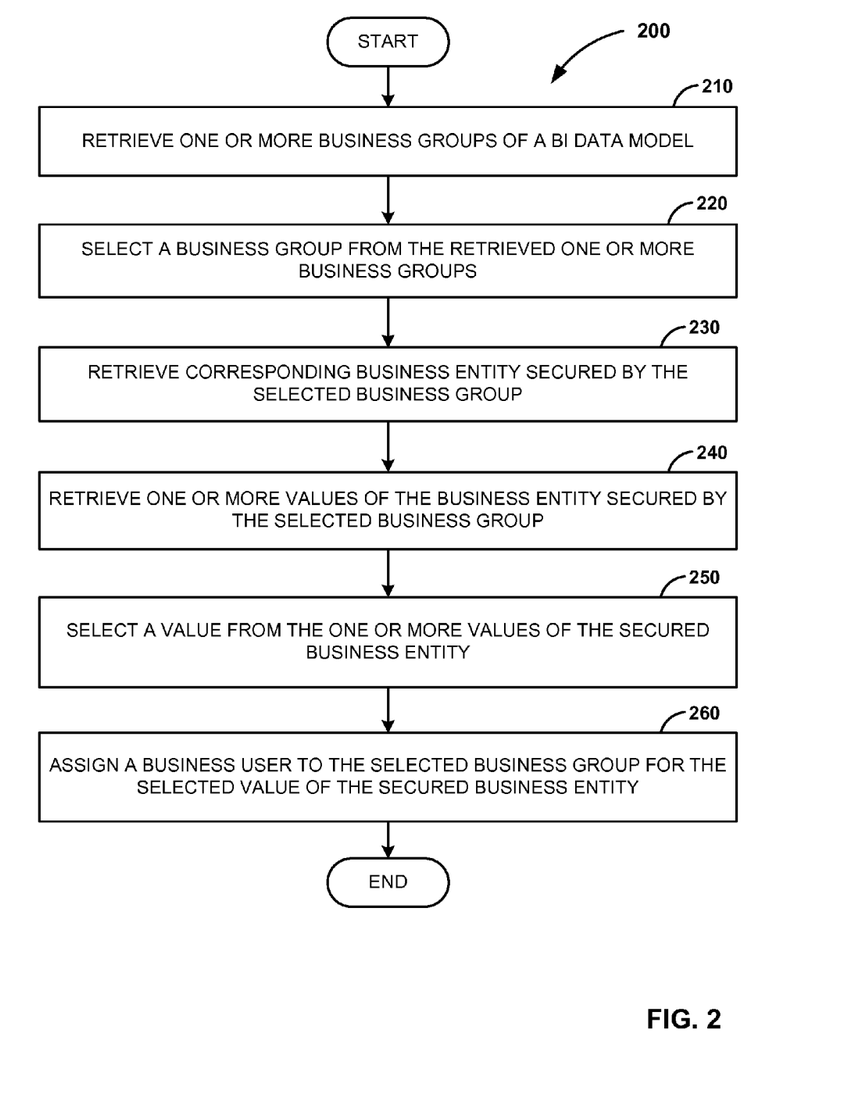
FIG. 2 is a flow diagram illustrating a process to assign a business user to a business group, according to one embodiment.

In one embodiment, a business group associates a business user with a business entity value or values. Access requests to the business entity sent by the business user are filtered based on the association of the business user to the business entity value. Thus, access to values of the business entity is controlled by the business group. FIG. 2 illustrates process 200 to assign a business user to a business group, according to one embodiment. At 210, one or more business groups of a BI data model are retrieved. For example, an administrator may request to view already created business groups. At 220, a business group from the retrieved one or more business groups is selected. The selected business group secures a corresponding business entity. For example, business group 'City Manager' may secure dimension 'City'. At 230, the corresponding business entity secured by the selected business group is retrieved. In one embodiment, it may be possible that a business group may secure more than one business entities. A business group may secure a business entity by enforcing row level security. For example, a business user assigned membership to the business group may send a request to access the business entity. In one embodiment, upon receiving the request, at runtime, a business security profile for the user may be created based on the business group of which the business user is a member. For example, business security profile filters settings may be set at runtime.

At 240, one or more values of the business entity secured by the selected business group are retrieved. In one embodiment, an administrator that is also a business user requests to retrieve values of the business entity that are available in the BI data model. As such, the administrator is also subject to security rules. For example, the administrator may also be secured by membership to one or more business groups. In one embodiment, based on membership of the administrator to one or more business groups, the values of the secured business entity that are retrieved may be filtered.

At 250, a value from the retrieved one or more values of the secured business entity is selected. For example, value 'Paris' of a secured dimension 'City' may be selected. At 260, a business user is assigned to the selected business group for the selected value of the business entity secured by the business group. The selected value of the secured business entity is associated with or assigned to the user. Requests from the business user to access the secured business entity are to be filtered based on the business entity value assigned to the user as a member to the selected business group. In one embodiment, the association of a business user to a business group is stored. For example, it may be stored that a business user 'John' is assigned to a business group 'City Managers' with value 'San Francisco' for the business entity 'City'.

In one embodiment, upon assigning the business user to the business group, a business security profile is created. For example, an application programming interface may be triggered that creates the business security profile. Filters settings of the business security profile are set up by adding a systematic filter on the secured business entity. The filter specifies that values of the business entity to be retrieved have to be equal to at least one value of at least one variable that is determined at runtime. The values of the variables are determined to correspond to the one or more business entity values that are associated with the business user requesting data from the business entity. For example, a business object 'City' that is a dimension may be secured, where a filter may specify that the values of the object 'City' to be retrieved have to be equal to the value of a variable, for example, 'UserCity', determined at runtime. At runtime, the value of the variable 'UserCity' is determined to correspond to a business object value assigned to the business user when the user was assigned membership to a business group such as 'City Managers'. Further, upon assigning the business user to the business group, the association between the business group and the created business security profile is stored. For example, association between the business group "City Managers" and the newly created business security profile is stored.

Figure 3:
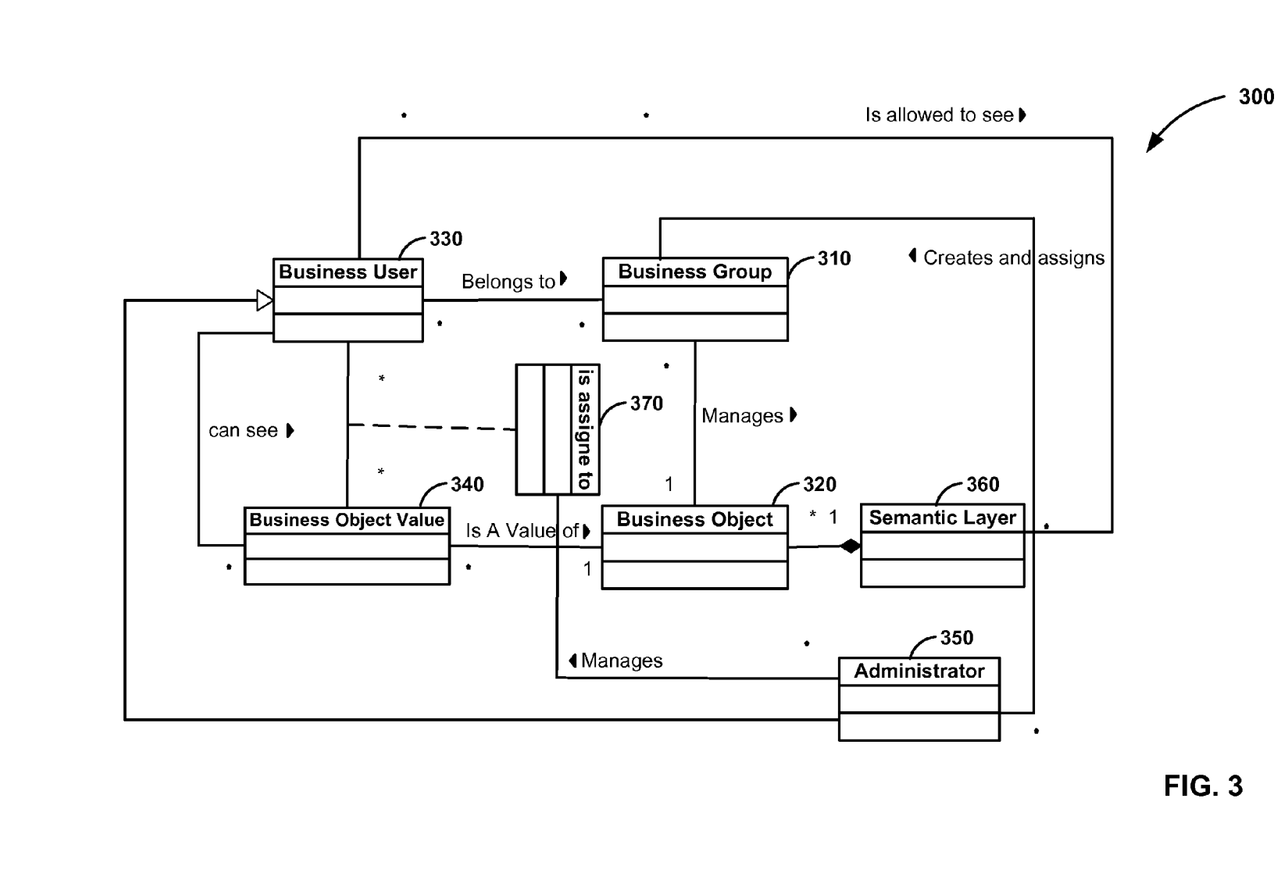
FIG. 3 is a flow block diagram illustrating an exemplary data structure of a business group, according to one embodiment.

FIG. 3 illustrates exemplary data structure 300 of a business group, according to one embodiment. Administrator 350 creates business group 310. Administrator 350 may also be a business user and may be assigned to one or more business groups. In one embodiment, multiple administrators may create various business groups to secure various BI entities available in a corresponding BI data model such as semantic layer 360. In one embodiment, semantic layer 360 may be a universe. Administrator 350 as a business user of semantic layer 360 is granted access to the semantic layer 360.

Business group 310 secures or manages business object 320. In one embodiment, multiple business groups may secure the same business entity. Business object 320 is an entity of semantic layer 360. Semantic layer 360 may include various business objects. Upon creating business group 310, administrator 350 assigns business object 320 to business group 310. Further, administrator 350 manages assignment of business users to business groups. For example, administrator 350 assigns business user 330 to business group 310. Thus, business user 330 belongs to or is a member of business group 310. Business user 330 may be assigned to business group 310 for a specific value. Thus, administrator 350 further selects a value of one or more values of business object 320 to assign the value to business user 330. For example, business object value 340 which is a value of business object 320 is selected. Then, business user 330 is assigned to business object value 340. In one embodiment, business object 320 may have a number of values such as business object value 340.

In one embodiment, an assignment of a business user to a business object value, which is secured by a business group, may be stored as an entity. For example, assignment 370 representing the association between business user 330 and business object value 340 may be stored. Based on assignment 370, business user 330 is granted access to data including values of business object 320 that are equal to business object value 340. Business user 330 may be assigned to more than one value of business object 320. Also, more than one business users which are members of business group 310 may be assigned to the same business object value 340. Business user 330 may be a member of and may belong to more than one business groups.

Once a user is assigned membership to one or more business groups, row level security filters would be enforced when the user requests to access business entities of the BI data model and query the underlying data source, respectively. For example, the user may request to access and view BI resources and, thus, generate queries to the underlying data sources of a BI system. In one embodiment, a BI resource references at least one business entity defined in a BI data model. Examples of BI resources include, but are not limited to, reports or report instances such as SAP® Crystal Reports® or OLAP Intelligence report, Desktop Intelligence Documents, and Web Intelligence documents. Other examples of BI resources that include references to business entities are analytics, dashboards, workspaces, strategy maps, scorecards, etc.

Figure 4:
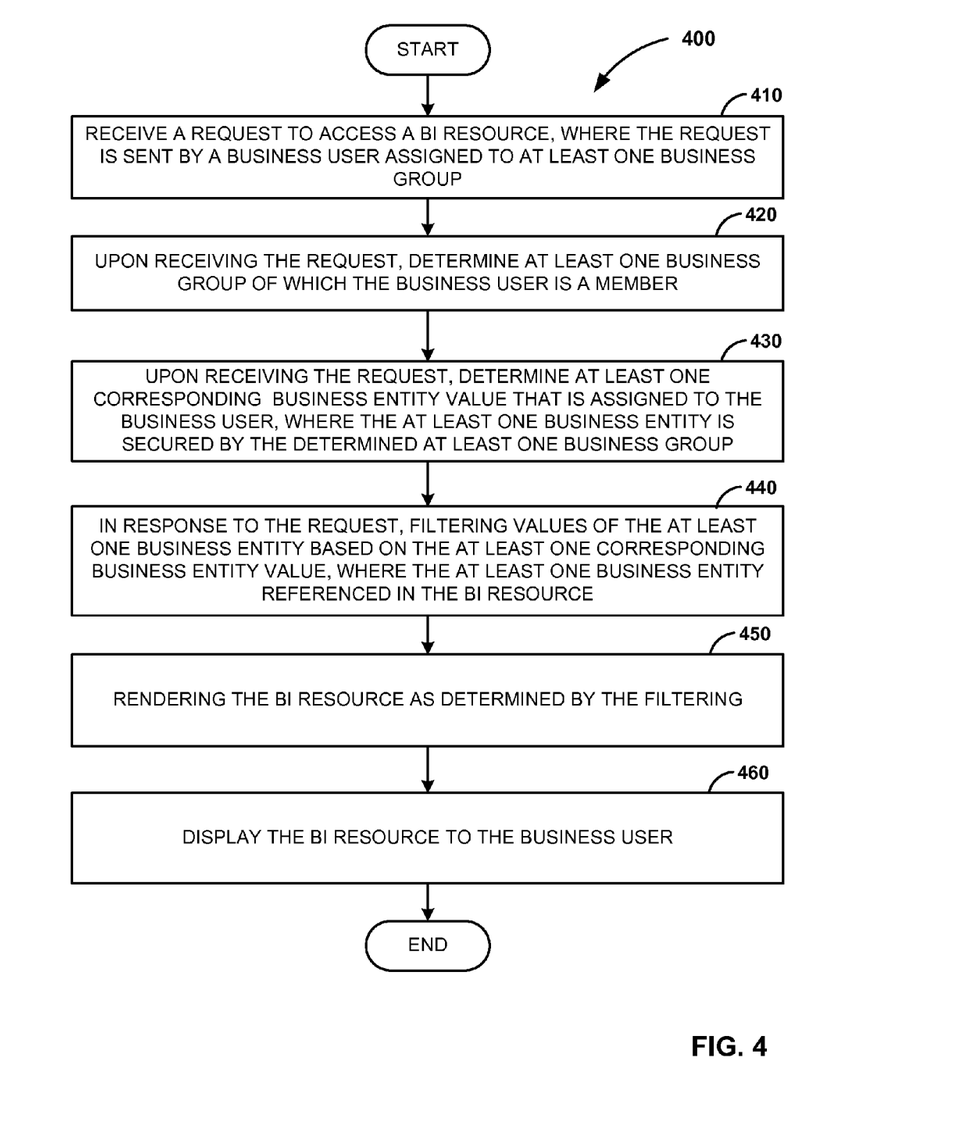
FIG. 4 is a flow diagram illustrating a process to enforce security as determined by business groups to which a business user is assigned membership, according to one embodiment.

FIG. 4 illustrates process 400 to enforce security as determined by business groups to which a business user is assigned membership, according to one embodiment. At 410, a request to access a BI resource is received. The request is sent by a business user assigned to at least one business group. For example, a business user may send a request to refresh content of a dashboard stored in the BI system. At 420, upon receiving the request, at least one business group of which the business user is a member is determined. Further, at 430, at least one corresponding business entity value that is assigned to the business user is determined, where the at least one business entity is secured by the determined at least one business group. For example, business user 'John' may log into the BI system storing the requested dashboard. Business groups of which 'John' is a member may be included in the session information of 'John'. For example, based on the session information of 'John', it may be determined that 'John' is assigned to business group 'City Managers' with value 'San Francisco' of the business entity 'City' that is assigned to 'John'.

In one embodiment, the at least one business entity is referenced in the BI resource that the user requests to access. For example, the dashboard may be constructed to present current sales information across different geographies. As such, the dashboard may include sales data related to different cities and, thus, it may include information related to the dimension 'City'.

At 440, in response to the request, values of the at least one business entity are filtered from the BI resource based on the at least one corresponding business entity value. Thus, to refresh content of the dashboard, data is filtered by the at least one business entity value. Data is filtered from the BI resource because the at least one business entity is secured for the user by assignment to the business group.

At runtime, based on the session information of the business user that includes membership of the user to business groups, the corresponding business entity value is assigned to a filter variable of corresponding business security profile. Thus, upon receiving the request, the filters of the business security profile are applied at runtime. For example, based on the session information of 'John', the value 'San Francisco' is assigned to the variable 'UserCity' that is part of the business security profile created upon assigning 'John' to the business group 'City Managers' with value 'San Francisco'. In response to the request, a SQL query may be generated, where a filter associated to the object 'City' such as variable 'UserCity' specified by the respective business security profile may be added in the SQL query. The value of the filter variable 'UserCity' is resolved at runtime, and, a where clause based on the filter variable is included in the final SQL query.

At 450, the BI resource is rendered as determined by the filtering. For example, data in the dashboard is filtered to include data related to 'San Francisco' and other sales information of other cities may be excluded. At 460, the rendered BI resource is displayed to the business user. For example, the refreshed dashboard is displayed to 'John'.

Commonly, upon publishing a BI data model such as universe, a user role may be created that is associated with the BI model. For example, a role associated with a universe may be a named set of permissions that are attached to the universe. An example of a role that may be attached to a universe may be an "owner of a universe", where such a role may set permissions to read, write, or delete a file that represents the universe. Another example of a role may be "universe access" that permits users to access the universe. In one embodiment, users that are administrators may be assigned roles that grant permissions to access a corresponding BI model.

In scenarios where row level security needs to be administered in multiple organizations, there may be necessary to have different types of administrators. Administrators in respective organizations may create business groups, and identify users to assign to those business groups. In one embodiment, an administrator may designate another business user as an administrator and, thus, delegate administration of business entities security to other business users. According to one embodiment, administrators are also business users and as such are also members to one or more business groups. In one embodiment, security administration of business entities may be delegated from an administrator to another business user, where the delegation is subject to security rules as determined by the assignment of the administrator to business groups and respective business entities values. Thus, for example, if an administrator 'A' delegates security administration to business user 'B', security administration of business entities performed by user 'B' is secured by the respective business groups of administrator 'A'.

Figure 5:
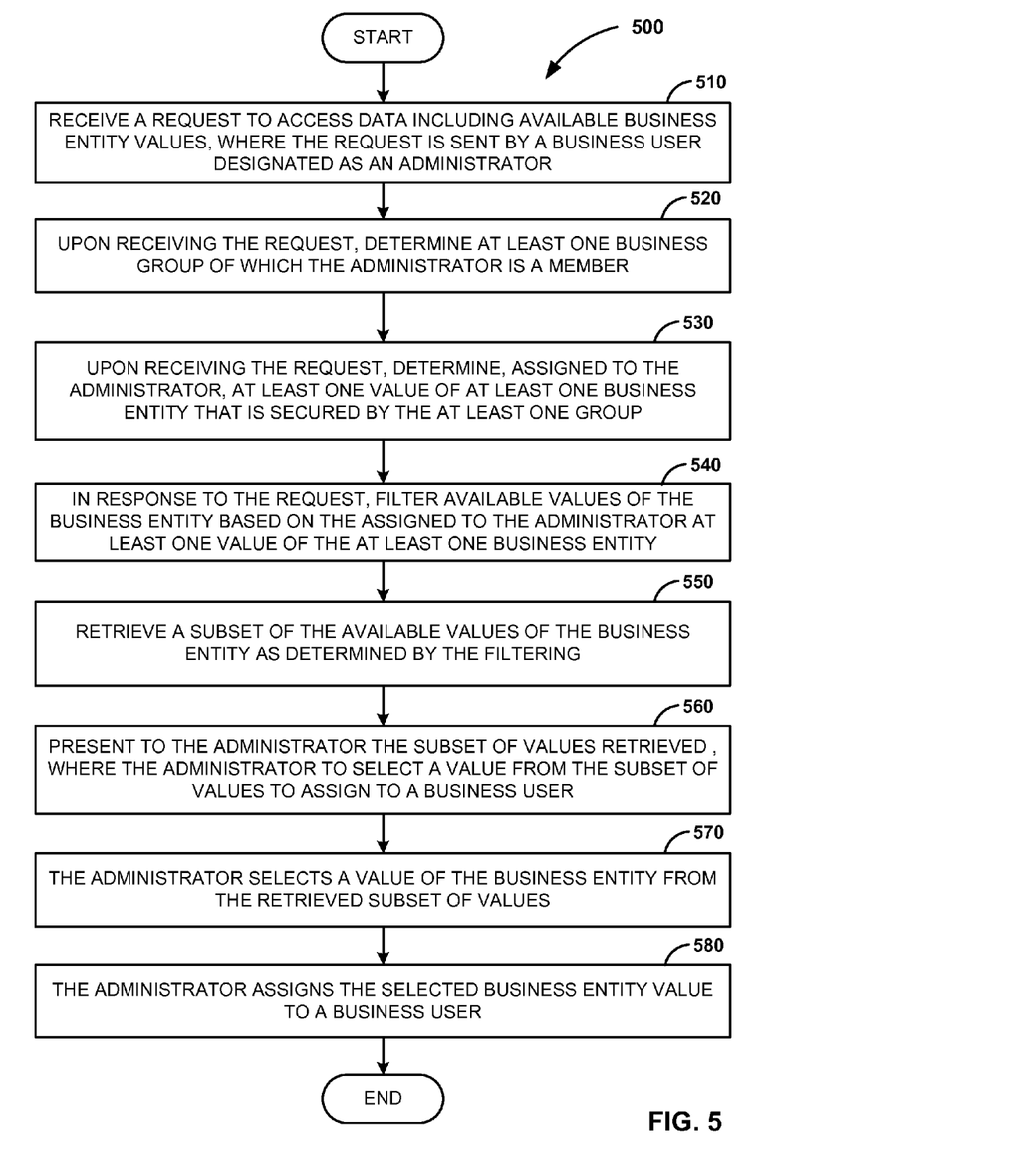
FIG. 5 is a flow diagram illustrating a process to execute a request to retrieve data including data values of a business entity, where the request is sent by an administrator to select a business entity value to assign to a business user, according to one embodiment.

FIG. 5 illustrates process 500 to execute a request to retrieve data including data values of a business entity. The request is sent by an administrator to select a business entity value to assign to a business user, according to one embodiment. At 510, a request to access data including available business entity values model is received. The available business entity values may be stored in an underlying data source of the BI model. The request may be sent by a business user to whom administration of security of business entities is delegated. By delegating administration rights to the business user, the business user is designated as an administrator. In one embodiment, the administrator requests to view values of a business entity in order to secure the business entity in the BI system for a business user.

Upon receiving the request, at 520, at least one business group of which the administrator is a member is determined. At 530, at least one value of corresponding at least one business entity is also determined. The at least one value is assigned to the administrator and the at least one business entity is secured by the at least one group. In one embodiment, the at least one group of which the administrator is a member secures the business entity that the administrator desires to secure for the business user. At 540, in response to the request, available values of the business entity are filtered based on the assigned to the administrator at least one value of the at least one business entity.

At 550, a subset of the available values of the business entity is retrieved as determined by the filtering. Values of the business entity that do not match the assigned to the administrator at least one value of the corresponding at least one business entity are filtered out. Thus, values of the business entity that are retrieved are determined based on the assignment of the administrator to the at least one business group that includes security of the at least one business entity.

At 560, the subset of retrieved values is presented to the administrator, where the administrator to select a value from the subset of values to assign to a business user. In one embodiment, the administrator may select more than one value of the business entity to assign to the business user. At 570, the administrator selects a value of the business entity from the retrieved subset of values and, at 580, the administrator assigns the selected business entity value to a business user.

To illustrate with an example, administrator 'A' may be a member of business group 'Region Manager', which secures the business object 'Region'. Administrator 'A' may be assigned 'Western Europe' as a value of the business object 'Region'. Because administrator 'A' is subject to the security rules enforced by the business groups to which administrator 'A' belongs, administrator 'A' can assign business entities values that match the value 'Western Europe' of the object 'Region'. For example, Administrator 'A' may assign cities that are from the region 'Western Europe' to business users that administrator 'A' manages and secures. Thus, security rules are cascaded from an administrator to the business users managed by that administrator.

Figure 6:
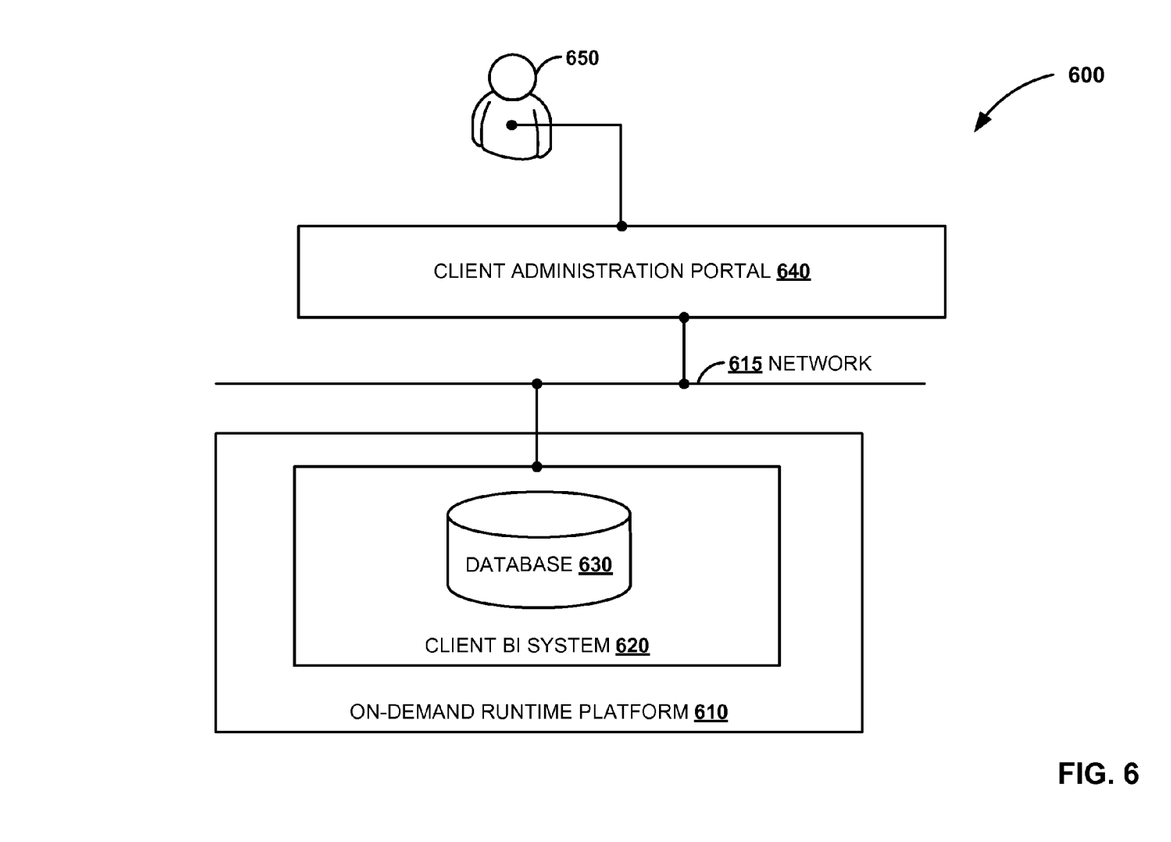
FIG. 6 is a block diagram illustrating an exemplary computer system to provide automated and delegated administration of model-based row-level security, according to one embodiment.

FIG. 6 illustrates an exemplary computer system 600 to provide automated and delegated administration of model-based row-level security, according to one embodiment. On-demand runtime platform 610 may provide runtime functionality to systems and applications deployed on on-demand runtime platform 610. In one embodiment, on-demand runtime platform 610 may include application server as a core part for building runtime environment based on the on-demand runtime platform 610. For example, the application server may be a Java® application server for executing Java® based applications such as a Lean Java Server (LJS). In another example, the application server may be a webserver to provide environment for execution of web based applications. Runtime platform 610 may further include virtual machine such as Java Virtual Machine (JVM). In one embodiment, on-demand runtime platform 610 is a cloud infrastructure. There are a number of vendors that provide commercial cloud-based runtime platforms. Just as an example, SAP AG provides SAP NetWeaver® Cloud, a Java® based Platform-as-a-Service offering that makes it possible to deploy and use Java® applications in a cloud environment.

In one embodiment, client BI system 620 is deployed to and based on on-demand runtime platform 610. Client BI system 620 may include database 630. In one embodiment, database 630 may be a graph-based database that stores created data structures of business groups (e.g., data structure 300 in FIG. 3). The associations between business groups and business objects secured by those groups may be stored in database 630. Further, associations between business users and business groups may also be stored in database 630. Such associations may be represented as a graph structure in database 630.

In one embodiment, administrator 650 is a business user that may administer security of business entities of a BI model in administration portal 640. The client BI system 620 exploits the corresponding BI data model. Administration portal 640 may be a user interface of client BI system 620 for automated and delegated administration of security of business entities, where the security is automatically enforced by business groups and assignment of users to those business groups.

Administrator 650 may operate with an instance of administration portal 640. Other administrators may operate with other instances of administration portal 640. Administrator 650 may administer row-level security functionality provided by client BI system 620 via network 615. Network 615 may be the Internet, an intranet, or other public or private computer network.

Administrator 650 may create business groups and identify business entities to secure by assigning those entities to created business groups. Further, administrator 650 may identify business users to secure in the client BI system 620. Administrator 650 also selects values of the secured business entities to assign to business users to be secured. In one embodiment, administrator 650 may delegate security administration of business entities to other business users of client BI system 620, where administrator 650 is also submitted to security enforced by membership of administrator 650 to one or more business groups.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
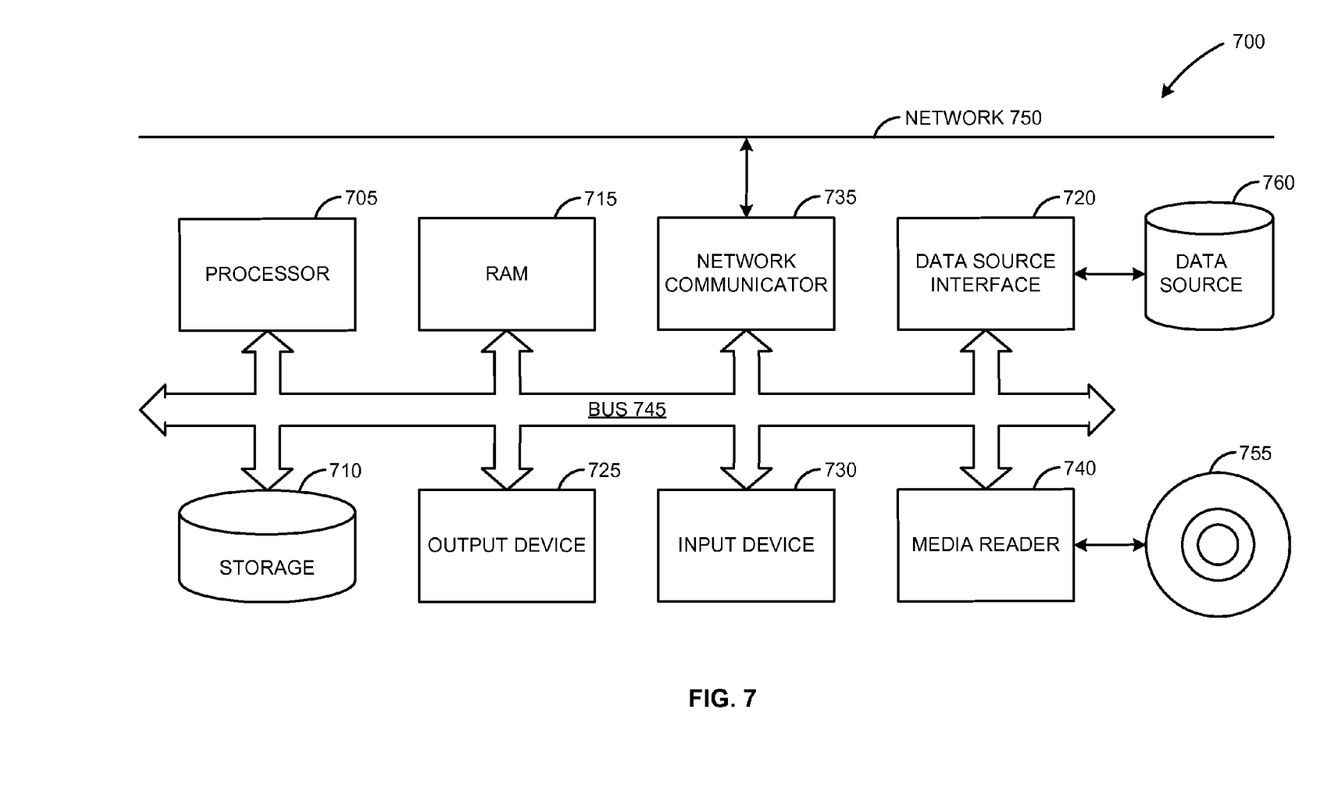
FIG. 7 is a bock diagram illustrating an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, all of the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system to automatically control access of a user to business intelligence (BI) data on a row level, the system including:
   a memory to store computer executable instructions; and
   a processor coupled to the memory to execute the instructions to perform operations comprising:
      selecting a user to be secured;
      retrieving a business group of a BI model, wherein access to a business entity of the BI model is secured based on the business group;
      retrieving a plurality of values of the business entity;
      selecting at least one value of the plurality of values;
      assigning the user to the business group for the at least one value, wherein requests from the user to access the business entity are filtered based on the at least one value;
      receiving a request to access available, in a data source of the BI model, data of a business entity, wherein the request is sent by an administrator that is secured by membership to at least one business group;
      upon receiving the request, determining the at least one business group of which the administrator is a member;
      upon receiving the request, determining, assigned to the administrator, at least one value of at least one business entity that is secured by the at least one business group;
      in response to the request, filtering available values of the business entity based on the at least one value of the at least one business entity; and
      retrieving a subset of the available data of the business entity, wherein the subset of the available data is characterized by the at least one value of the at least one business entity.

2. The computer system of claim 1, wherein the operations further comprise:
   designating the user as an administrator to delegate security administration of business entities, wherein the user is assigned to the business group for the at least one value, and wherein the business entity is secured by the business group;
   receiving a request sent by the user designated as administrator to secure the business entity for a business user; and
   determining data of the business entity that can be filtered based the assignment of the administrator to the business group for the at least one value.

3. The computer system of claim 1, wherein assigning the user to the business group for the at least one value, further comprises:
   in response to the assignment of the user to the business group for the at least one value of the plurality of values of the business entity, generating security filter settings, wherein the security filter settings include a filter attached to the business entity that specify that the user can retrieve data of the business entity that is characterized by at least one value.

4. The computer system of claim 1, wherein the operations further comprise:
   storing an association between the user and the business group, an association between the user and the at least one value, and an association between the business entity and the business group.

5. A computer implemented method to automatically control access of a user to data of a business intelligence (BI) system on a row level, the method comprising:
   selecting a user to be secured;
   retrieving, from a memory of the computer, a business group of a BI model, wherein access to a business entity of the BI model is secured based on the business group;
   retrieving a plurality of values of the business entity;
   selecting at least one value of the plurality of values; and
   a processor of the computer, securing the user by assigning the user to the business group for the at least one value, wherein requests from the user to access the business entity are filtered based on the at least one value;
   receiving a request to access available, in a data source of the BI model, data of a business entity, wherein the request is sent by an administrator that is secured by membership to at least one business group;
   upon receiving the request, determining the at least one business group of which the administrator is a member;
   upon receiving the request, determining, assigned to the administrator, at least one value of at least one business entity that is secured by the at least one business group;
   in response to the request, filtering available values of the business entity based on the at least one value of the at least one business entity; and retrieving a subset of the available data of the business entity, wherein the subset of the available data is characterized by the at least one value of the at least one business entity.

6. The method of claim 5 further comprising:
designating the user as an administrator to delegate security administration of business entities, wherein the user is assigned to the business group for the at least one value, and wherein the business entity is secured by the business group;
receiving a request sent by the user designated as administrator to secure the business entity for a business user; and
determining data of the business entity that can be filtered based the assignment of the administrator to the business group for the at least one value.

7. The method of claim 5, wherein assigning the user to the business group for the at least one value, further comprises:
in response to the assignment of the user to the business group for the at least one value of the plurality of values of the business entity, generating security filter settings, wherein the security filter settings include a filter attached to the business entity that specify that the user can retrieve data of the business entity that is characterized by at least one value.

8. A non-transitory computer readable medium storing instructions thereon, which when executed by a processor cause a computer system to:
select a user to be secured;
retrieve a business group of a BI model, wherein access to a business entity of the BI model is secured based on the business group;
retrieve a plurality of values of the business entity;
select at least one value of the plurality of values; and
assign the user to the business group for the at least one value, wherein requests from the user to access the business entity are filtered based on the at least one value;
receive a request to access available, in a data source of the BI model, data of a business entity, wherein the request is sent by an administrator that is secured by membership to at least one business group;
upon receiving the request, determine the at least one business group of which the administrator is a member;
upon receiving the request, determine, assigned to the administrator, at least one value of at least one business entity that is secured by the at least one business group;
in response to the request, filtering available values of the business entity based on the at least one value of the at least one business entity; and
retrieve a subset of the available data of the business entity, wherein the subset of the available data is characterized by the at least one value of the at least one business entity.

9. The computer readable medium of claim 8, wherein the instructions when executed by the processor cause the computer system further to:
designate the user as an administrator to delegate security administration of business entities, wherein the user is assigned to the business group for the at least one value, and wherein the business entity is secured by the business group;
receive a request sent by the user designated as administrator to secure the business entity for a business user; and
determine data of the business entity that can be filtered based the assignment of the administrator to the business group for the at least one value.

10. The computer readable medium of claim 8, wherein the instructions when executed by the processor cause the computer system further to:
store an association between the user and the business group, an association between the user and the at least one value, and an association between the business entity and the business group.

* * * * *